Figure 1:
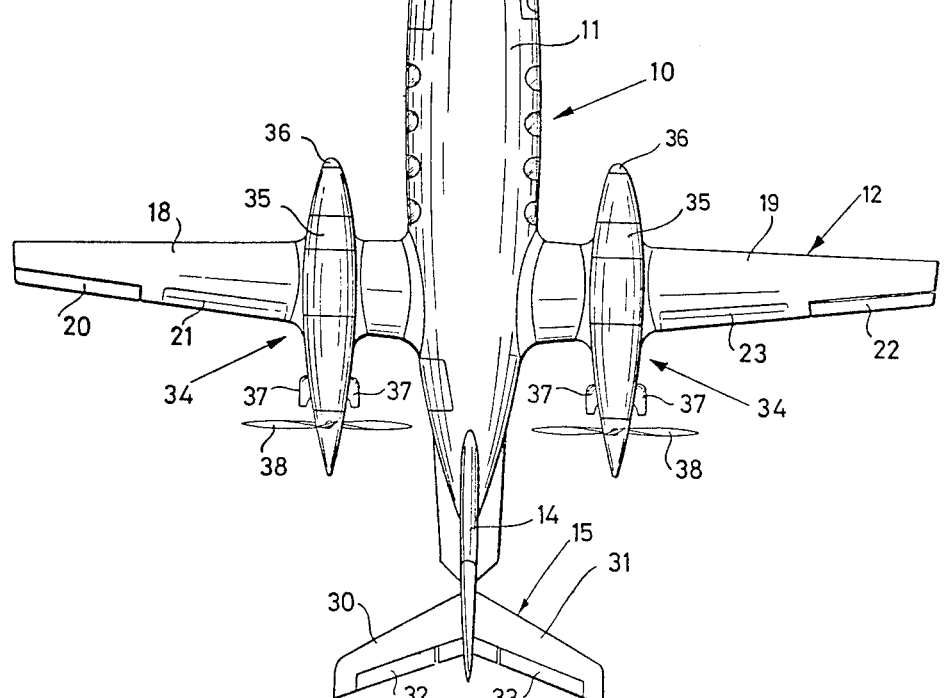

United States Patent [19]

Mazzoni

[11] Patent Number: 4,746,081
[45] Date of Patent: May 24, 1988

[54] AIRCRAFT

[75] Inventor: Alessandro Mazzoni, Genova, Italy

[73] Assignee: Industrie Aeronautiche e Rinaldo Piaggio S.p.A., Italy

[21] Appl. No.: 382,664

[22] Filed: May 27, 1982

[30] Foreign Application Priority Data

Jan. 25, 1982 [IT] Italy .................. 19275 A/82

[51] Int. Cl.⁴ .............................. B64L 5/02
[52] U.S. Cl. ................. 244/89; 244/45 R; 244/45 A
[58] Field of Search ........... 244/45 R, 45 A, 55, 244/89; D12/331, 332, 337, 339

[56] References Cited

U.S. PATENT DOCUMENTS

| D. 237,957 | 12/1975 | Rellis | D12/332 |
|---|---|---|---|
| D. 240,721 | 7/1976 | Bunyard | D12/332 |
| D. 269,669 | 7/1983 | Hancock et al. | D12/332 |
| 1,710,423 | 4/1929 | Lindstrand | 244/89 |
| 2,402,311 | 6/1946 | Bissett | 244/45 A |
| 2,430,793 | 11/1947 | Wells | 244/45 R |
| 2,604,276 | 7/1952 | Huben | 244/55 |
| 3,362,659 | 1/1968 | Razak | D12/332 |
| 3,485,462 | 12/1969 | Spence | 244/55 |
| 3,883,094 | 5/1975 | Mederer | 244/45 A |
| 4,116,405 | 9/1978 | Bacchi et al. | D12/331 |

FOREIGN PATENT DOCUMENTS 0033053  8/1981  European Pat. Off. .......... 244/45 A

OTHER PUBLICATIONS

"Popular Science", Feb. 1983, *Future Commuter* under heading of Science Newsfront.

Primary Examiner—Joseph F. Peters, Jr.
Assistant Examiner—Rodney Corl
Attorney, Agent, or Firm—Laney, Dougherty, Hessin & Beavers

[57] ABSTRACT

This invention relates to an aircraft having three lift surfaces, and precisely a main wing lift surface located in an intermediate position of the aircraft and two less extended lift surfaces positioned, respectively, in a position ahead of the main wing surface and astern thereof.

1 Claim, 2 Drawing Sheets

AIRCRAFT

This invention relates to an aircraft having a nonconventional arrangement of its lift surfaces.

In the past, there have been embodied, or merely suggested, a number of aircraft forms different from the conventional ones, and composed of a main lift wing and a tail lift surface.

Among the several suggestions, the one is worth noting which still provides for a main lift wing, but in combination with another lift surface which, however, is located ahead of the main wing. Such a configuration is commonly dubbed a "canard".

The advantage of the "canard" configuration as compared with the conventional design lies in the increase of the maximum lift, the lift surface being the same. This fact stems from the circumstance that the balancing loads are obtained with the aid of upward directed aerodynamic forces rather than with downward directed forces, as required by the conventional configuration.

Regrettably enough, the major fraction of such a potential advantage of the "canard" configuration becomes lost due to the mutually counteracting actions on the stability and manoeuverability prerequisites as exerted by the position of the centre of gravity, the area of the front lift surface and the longitudinal distribution of the aerodynamic forces.

As a matter of fact a lift surface placed in a front position has the same balancing ability as a conventional stabilizer in a rear position but its effects on the stability are reversed.

While a lift surface placed arrear has a stabilizing action, a lift surface placed ahead has a destabilizing action.

In a "canard-type" aircraft, an accurately determined destabilizing effect can be accepted for a compensation of the advanced position of the centre of gravity so as to reduce the manoeuvering loads. However, the result is that, for a given position of the centre of gravity, the front lift surface must be wide enough so as to generate equilibrium forces under any flight conditions, but, concurrently, it must not exceed the maximum area which is required by the stability conditions.

These two requirements can be fulfilled simultaneously but for a very restricted excursion span of the centre of gravity while simultaneously undergoing severe restrictions as to the maximum lift of the main wing, the consequence being a degradation of the potential benefits afforded by the "canard" configuration.

In actual practice, the improvement of the maximum lift which can be obtained with a "canard" configuration comprising two lift surfaces is always poor.

The only expedient capable of circumventing the limitations outlined above as to the maximum lift of the wing is to offset the requirements as to natural stability by adopting artificial stabilization means. Such means are not yet regarded as being adequately reliable for civilian traffic aircrafts.

Another typical problem with the "canard" configuration is connected with the quality of the flight and is the loss of the longitudinal control of the aircraft in the stall conditions, due to the positioning of the aircraft elevators.

An object of the present invention is to suggest an aircraft which overcomes the typical drawbacks of the "canard" configuration as indicated above, while retaining the potential distinctive characteristics over the conventional configuration without resorting to artificial means for improving the lift by a power increase and/or artificial means for improving the stability.

Said object is achieved by providing an aircraft which comprises lift surfaces which are connected to a fuselage which is extended from a front prow point to a rear tail point, characterized in that said lift surfaces are composed of:

a main wing lift surface mounted on said fuselage in such a position that the centre of pressure of said wing surface falls behind the centre of gravity of said aircraft in the direction towards said rear tail point;

a front lift surface mounted on said fuselage ahead of the centre of gravity of said aircraft in the direction towards said front prow point, and a rear lift surface mounted on said fuselage behind said main wing lift surface.

Figure 3:
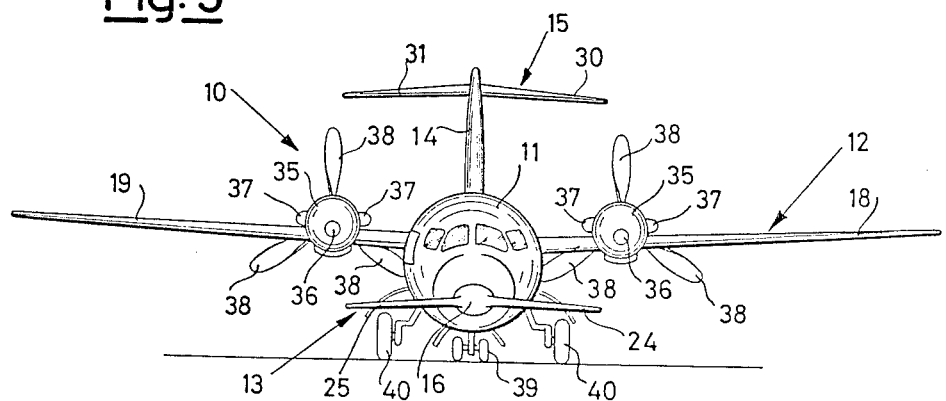
Figure 4:
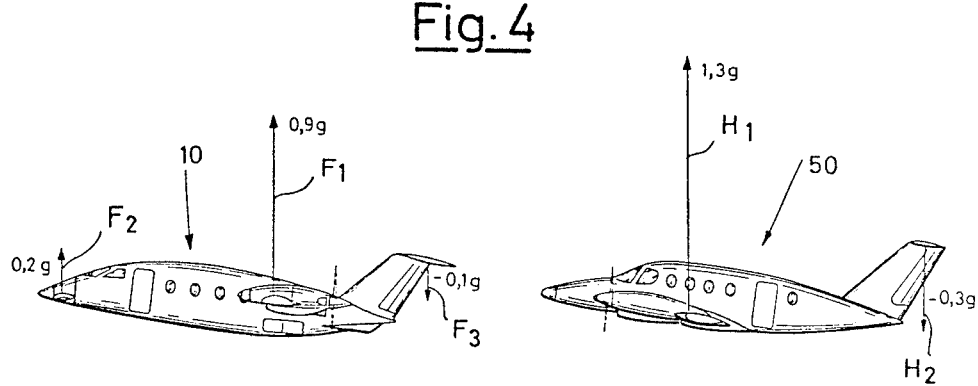
Figure 2:
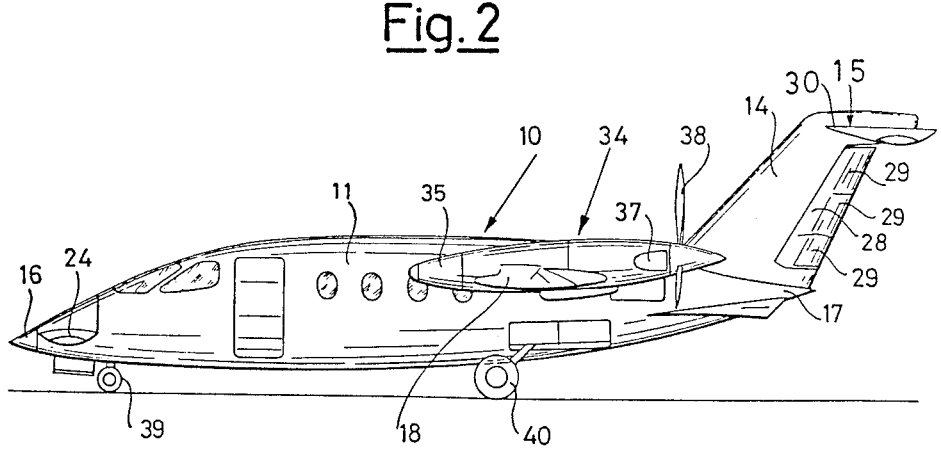

In order that the features and the advantages of the present invention may be better understood the description will be reported hereinafter of an exemplary non-limiting embodiment, thereof, as illustrated in the accompanying drawings, wherein:

FIG. 1 is a plan view of an aircraft constructed according to the present invention, FIG. 2 is a side elevational view of the air-craft of FIG. 1, FIG. 3 is a front view of the aircraft made according to FIG. 1, and FIG. 4 is a side view of the aircraft of FIG. 1, and, besides it, for comparison, of a conventional aircraft.

The aircraft made according to the invention is generally indicated at 10.

It is comprised of a fuselage 11, whereon there are mounted a main wing, 12, a front slat 13 and a vertical tail plane 14 to which is secured, in a position near the top of the plane 14, a horizontal tail plane 15 is connected.

The aircraft 10 also comprises propelling means mounted on the wing 12, which will be described hereinafter.

The fuselage has a pure tapered outline without any discontinuity and running from the nose 16, ahead, to the tail portion 17, astern.

The main wing 12 is placed across the fuselage 11 roughly at the level of the half-height thereof and at a position about two thirds of the fuselage length starting from the nose 16, behind the centre of gravity of the aircraft 10 in the direction towards the tail portion 17. Said wing 12 is composed of a left half-wing 18 and a right half-wing 19, which are connected together so as to form, transversally, a dihedron angle $+2°$ wide (inclined upward). On the left half-wing 18 there are mounted on aileron 20 and a flap 21 and, correspondingly, on the right half-wing 19 there are mounted an aileron 22 and a flap 23.

The front slat 13 is transversally connected in a fixed manner to the fuselage 11, ahead of the centre of gravity of the aircraft 10, in the vicinity of the nose 16, in a position lower than that of the wing 12 and with the angle of incidence wider than the angle of incidence of the main wing 12. The slat 13 has a superficial area which is narrower than one third of that of the wing 12 and is composed of a left half-slat 24 and a right half-slat 25, which are symmetrical relative to the central axis of the aircraft 10 and are connected together so as to form, transversally, a dihedron angle of $-5°$ (inclined downward). On the left half-slat 24 there is installed a flap 26 and, correspondingly, a flap 27 is mounted on the right half-slat 25.

The vertical tail plane 14 is connected to the rear end of the fuselage 11. It comprises a rudder 28 and directional adjustment tabs 29.

The horizontal tail plane 15 is thus arranged at a position which is at a level higher than that of the wing 12 and has a superficial area which is less than one third that of the area of the main wing 12. Said plane 15 is composed of a left half-plane 30 and a right half-plane 31, which are symmetrical relative to the central axis of the aircraft 10 and are rigidly connected together so as to form a negative dihedral angle (inclined downward). On the left half-plane 30 an elevator 32 is installed, and, correspondingly, an elevator 33 is installed on the right half-plane 31.

The propelling motive means are formed by two turbopropeller units 34, one of which is mounted on the left half wing 18 and the other on the right half wing 19 in positions which are symmetrical relative to the centre line of the aircraft 10.

Each of the units 34 comprises a turbine engine 35 with a front air intake 36 and exhaust tubes at the rear, said engine driving a thrust propeller 38, that is, a propeller which is positioned behind the trailing edge of the half-wing, with its axis on a plane which is parallel to the plane of symmetry of the aircraft 10.

The aircraft 10 rests on the ground on a central front landing gear, which is retractable in flight and on two landing gears 40, which are placed at the rear and laterally and are also retractable in flight.

Said aircraft is especially suitable for the medium-range transportation of some ten passengers and the entire passenger compartment within the fuselage 11 is positioned ahead of the main wing 12.

The aircraft 10, as described and illustrated herein, thus exploits, according to the invention, three lift surfaces, that is, the wing 12, the tab 13 and the horizontal tail plane 15, to obtain the aerodynamic support and the equilibrium of the forces which are active, as it is necessary during all the stages of the flight.

The main wing 12 generates the predominant fraction of the aerodynamic lift which is required in flight.

The front tab 13 contributes to the lift and the equilibrium of the aircraft.

The horizontal tail plane 15 contributes to the stability and the equilibrium of the aircraft and fulfils a task of longitudinal control and/or trimming by the rotation of the elevators 32 and 33.

The vertical tail plane 14, instead, provides both the stability and the directional control.

The three lift surfaces permit to redress the defects in the stability and the longitudinal control of the "canard" configuration, as discussed in the introductory portion of this specification, but without resorting to artificial means for increasing the lift by adopting a power increase and/or artificial means for improving the stability.

The reason therefor is the availability of an additional degree of freedom, as provided by the third lift surface, so as to fulfil at the same time the stability and manoeuverability requirements.

As a matter of fact, the configuration having three lift surfaces makes it possible to determine, for each position of the centre of gravity, a distribution of areas among the three surfaces such as to be able to exploit the contribution of the aerodynamic forces directed upward with a view to balancing the aircraft, while concurrently fulfilling the stability conditions.

In addition, if the function of controlling the longitudinal equilibrium is entrusted to the rear lift surface (tail plane 15), the stall of the aircraft does not reduce the power of the elevators.

The configuration, as described herein, having three lift surfaces, concurrently provides the potential favourable features as mentioned hereinabove for the "canard" configuration, as compared with the conventional one.

To give an evidence of this fact, FIG. 4 shows the aerodynamic forces, represented by the vectors $F_1$, $F_2$, $F_3$, acting upon the aircraft 10 having three lift surfaces, in comparison with the aerodynamic forces, as represented by the vectors $H_1, H_2$, which are activated upon a conventional aircraft 50 of the same class but with two lift surfaces only, in the flight condition which is characterized by the angle of stall incidence for which the vectors have the following modules: $F_1=0.9$ g; $F_2=0.2$ g; $F_3=-0.1$ g; $H_1=1.3$ g; $H_2=-0.3$ g.

In this flight condition, both the configurations must provide the maximum possible lift, so as to reduce the lfit surface which is required to obtain the desired stall speed. A reduction of the lift surface will originate, in fact, an increase of the efficiency at the cruising speed.

The ratio of the lift surface which is required for the aircraft 10 according to the invention, to the surface which is required for the conventional aircraft 50 is equal to the ratio of the sum of the magnitudes of the forces $F_1$, $F_2$, $F_3$ to the sum of the forces (in terms of magnitudes) $H_1$ and $H_2$.

From the comparison of the two configurations shown in FIG. 4, one obtains for the aircraft 10 according to the invention a saving of the overall required lift surface as great at 25% over the conventional aircraft 50.

The aircraft 10 affords other advantages.

By virtue of the use of the three lift surfaces, one exploits the benefits, both from the aerodynamic standpoint and from the viewpoint of the structural characteristics, which are originated by the midway positioning of the wing 12 as to its level relative to the fuselage 11, without having to suffer from reductions of the fuselage volume reserved for the payload.

On account of the positioning of the wing 12 relative to the fuselage 11, the main sources of noise, that is, the turbopropeller units 34, are in a position which is shifted backwards relative to the passenger compartment of the fuselage 11, so as to improve the comfort in said compartment.

A useful compartment volume becomes thus available, which is wider than that provided by the contemporary aircraft of the same class, while having aerodynamic efficiencies which are positively improved over those afforded by the present aircraft having two lift surfaces.

In addition to the aerodynamic advantages, an important aspect of the configuration with three lift surfaces is the possibility, which cannot be afforded by the configurations having two lift surfaces, of being able to design the general architecture of the aircraft without the typical requirement of a predetermined position of the centre of gravity. This fact opens the way to more rational architectural designs, with a consequent substantial reductions of the weight, and of the aerodynamic resistance, so that the dimensions of the machine can further be reduced.

Finally, the aircraft 10 is smaller, lighter and aerodynamically more efficient than the aircraft of the same class as available today.

It is obvious that the present exemplary embodiment does not set any limitations to possible modifications and/or additions.

The idea of the three lift surfaces can be applied to aircraft having dimensions and tasks other than those described herein, while obtaining the same advantages.

Geometrical variations of the shape, the dimensions, both absolute and relative, and the relevant positioning of the three lift surfaces, can be introduced to optimize the configuration for the operative requirements of the individual aircraft, since what has been shown in the accompanying drawings has been originated solely by the particular class of aircraft described herein.

For example, the front tab 13 can be placed at the same level as the main wing 12, or at a higher level. In addition, the entire surface of the tab can be rotated on a vertical plane thus contributing towards the functions of longitudinal control and/or trimming. Lastly, it can be comparatively movable relative to the fuselage, or the two half-tabs 24 and 25 can effect rotations relative to one another.

The entire surface of the horizontal tail plane 15 can also be rotated on a vertical plane.

In connection with the motorized propelling means, one may provide two turbopropeller units arranged like the units 34, but with pulling propellers placed ahead of the main wing.

As a rule, it is possible to adopt propelling means consisting of conventional propellers, or turbopropellers, mounted on the fuselage ahead or astern, or in an intermediate position, or also mounted on the wings. In the case of conventional propellers, it can be envisaged to place the engines in the fuselage and the propellers on the wings, by connecting the latter to the engines by means of adequate linkages.

Lastly, there is to be added that the approach suggesting three lift surfaces according to the present invention can be adopted also on aircraft having no propelling means of their own, such as the gliders.

I claim:

1. A three-lift surface aircraft characterized in that it comprises, in combination:
    a fuselage having a minimum aerodynamic resistance and the external outline of which is absolutely devoid of any curvature discontinuities,
    a main wing forming a main lift surface equipped with wing flaps and ailerons, placed across said fuselage at a level about midway thereof,
    a front tab forming a front lift surface, rigidly connected to the front end of said fuselage and having an area less than one third of the area of said main wing, composed of two symmetrical half-tabs relative to the centre line of the aircraft and rigidly connected together so as to form a negative dihedron and positioned beneath the plane of said main wing and being equipped with wing flaps,
    a vertical tail plane, equipped with a rudder, installed behind said main wing,
    a horizontal tail plane forming a rear lift surface having an area less than one third of the area of said main wing, consisting of two half-planes which are symmetrical relative to the centre line of the aircraft and are connected rigidly together so as to form a negative dihedron, mounted in elevation on said vertical tail plane, and being equipped with elevators,
    two turbopropeller engines which drive propellers positioned behind said main wing, installed on said wing in a position symmetrical relative to the middle plane of the aircraft,
    a passenger compartment placed in said fuselage ahead of said main wing,
    a front landing gear which can fully be retracted within the fuselage, and
    two main rear landing gears which can completely be retracted within said fuselage behind the passenger compartment thereof.

* * * * *